US012095770B2

(12) United States Patent
Jiang et al.

(10) Patent No.: US 12,095,770 B2
(45) Date of Patent: Sep. 17, 2024

(54) CONNECTING INTERNET OF THING (IOT) DEVICES TO A WIRELESS NETWORK

(71) Applicant: Hewlett Packard Enterprise Development LP, Houston, TX (US)

(72) Inventors: Yafeng Jiang, Beijing (CN); Daniel Harkins, Santa Clara, CA (US); Rajesh Kumar Ganapathy Achari, Maharashtra (IN); Amogh Guruprasad Deshmukh, Santa Clara, CA (US); Chunfeng Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 652 days.

(21) Appl. No.: 17/346,366

(22) Filed: Jun. 14, 2021

(65) Prior Publication Data

US 2022/0400118 A1   Dec. 15, 2022

(51) Int. Cl.
*H04L 9/40* (2022.01)
*G06F 21/00* (2013.01)
*G06F 21/45* (2013.01)
*G06F 21/60* (2013.01)
*G16Y 30/10* (2020.01)
*H04L 9/32* (2006.01)

(52) U.S. Cl.
CPC ............ *H04L 63/105* (2013.01); *G06F 21/45* (2013.01); *G06F 21/604* (2013.01); *H04L 9/3242* (2013.01); *H04L 63/205* (2013.01); *G16Y 30/10* (2020.01)

(58) Field of Classification Search
CPC ....... G16Y 30/10; G06F 21/45; G06F 21/604; G06F 21/30; H04L 63/08; H04L 63/0884; H04L 63/0892; H04L 63/10; H04L 63/108
See application file for complete search history.

(56) References Cited

U.S. PATENT DOCUMENTS

| 10,034,118 | B2 | 7/2018 | Goluboff |
| 10,694,557 | B2 | 6/2020 | Gupta et al. |
| 10,833,926 | B2 | 11/2020 | Ramisetty et al. |
| 2016/0112406 | A1* | 4/2016 | Bugrov .............. H04L 63/102 726/10 |
| 2018/0109418 | A1 | 4/2018 | Cammarota et al. |
| 2019/0306710 | A1* | 10/2019 | Cammarota ......... H04W 12/06 |
| 2019/0356482 | A1* | 11/2019 | Nix .................... H04W 12/041 |

OTHER PUBLICATIONS

Zoualfaghari, M. et al., Zero-Touch Wi-Fi, (Research Paper), Living in the Internet of Things, May 1-2, 2019, 3 Pgs.

* cited by examiner

*Primary Examiner* — Edward Zee
(74) *Attorney, Agent, or Firm* — Hewlett Packard Enterprise Patent Department

(57) ABSTRACT

Example implementations relate to connecting an IoT device to a wireless network using Device Provisioning Protocol (DPP). An authentication server receives a DPP network access authorization request including a connector identifier from an Access Point (AP) in communication with the IoT device. The connector identifier is a hash of the public network access key of the IoT device. If the connector identifier is valid, the authentication server determines a configurable policy from a set of configurable policies that is applicable to the IoT device. The authentication server transmits network permissions defined in the configurable policy to the AP. The IoT device is connected to the wireless network by the AP based on the network permissions.

17 Claims, 7 Drawing Sheets

CONNECTING INTERNET OF THING (IOT) DEVICES TO A WIRELESS NETWORK

BACKGROUND

An Internet of Things (IoT) device is a hardware device that connects to the Internet to transmit data to other devices or people. Examples of IoT devices may include but are not limited to, sensors, actuators, gadgets, appliances, or machines that have support for Internet connectivity. The IoT devices are generally provisioned with an internet protocol (referred hereafter as "IP") address to connect to the Internet. Once connected to the Internet, the IoT devices are capable of transferring data and/or receiving control signals over a wireless network (e.g., a Wi-Fi network).

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
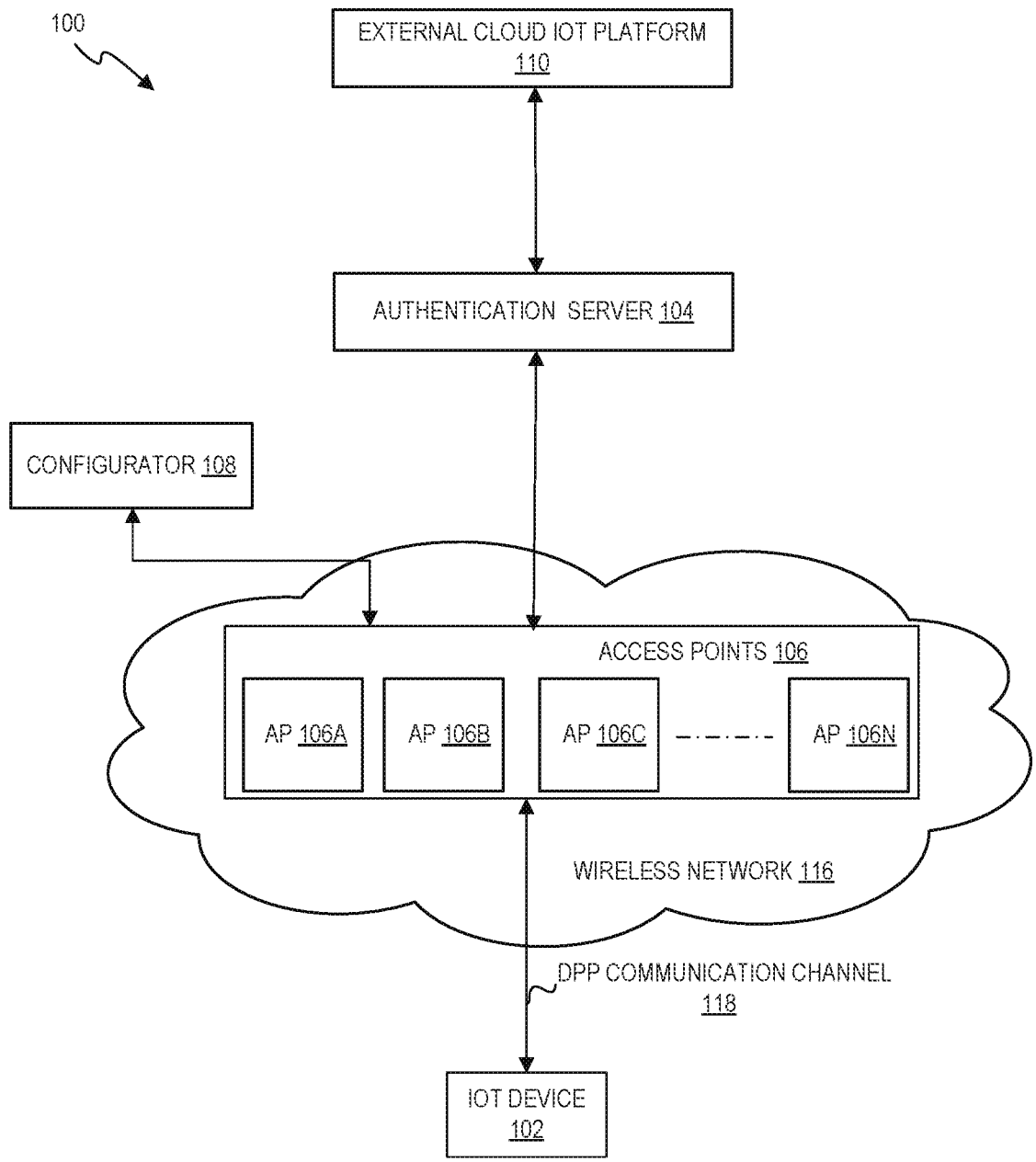
FIG. 1 is a system for enabling onboarding of an IoT device to a wireless network using device provisioning protocol (DPP), in accordance with an example.

Throughout the drawings, identical reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "and/or" as used herein refers to and encompasses any and all possible combinations of one or more of the associated listed items. As used herein, the term "includes" means includes but is not limited to, the term "including" means including but not limited to. The term "based on" means based at least in part on.

For purposes of explanation of the present disclosure, certain examples are described with reference to the components illustrated in FIGS. 1-7. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Furthermore, the sequence of operations described in connection with FIGS. 2, 3, 4, and 5 are examples and are not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

IoT device provisioning is performed when an IoT device (e.g., a sensor or an appliance) is being enrolled onto a cloud platform. The IoT device needs to be authenticated and configured to be a part of the cloud platform. Once authenticated and configured, the IoT device can connect to a wireless network (e.g., a Wi-Fi network) and send data to the cloud platform.

IoT devices may have limited or non-existent user interfaces, resulting in several challenges in the onboarding of the IoT devices to a Wi-Fi network. Generally, a user has to manually connect and configure an IoT device from a smartphone or a separate computer. In some cases, the IoT device may also require a customer service representative from a wireless network provider to manually configure the IoT device. This type of manual provisioning of the IoT device is not desirable for provisioning a multitude of IoT devices as this would require several man-hours.

Further, in case a provisioning mechanism is insecure, there may be chances of compromise of data in the IoT device or at the IoT cloud platform when the IoT device connects to the wireless network. Hence, a secure, fast, and user-friendly mechanism that provisions an IoT device with a security credential and then connects the IoT device to a wireless network using the security credential may be desirable.

In accordance with aspects of the present disclosure, examples for connecting an IoT device to a wireless network are presented. In some examples, the provisioning of the IoT device with a security credential and connecting the IoT device to the wireless network as described herein is based on a Device Provisioning Protocol (DPP). The DPP refers to a mechanism promulgated by the Wi-Fi Alliance, a world-wide network of companies that aims to drive global Wi-Fi adoption, for onboarding IoT devices to a cloud IoT platform.

In some examples, DPP messages may be used by the IoT device to communicate with a configurator via an access point (AP) in the wireless network. The configurator may be an entity that provisions the IoT device with the security credential. The configurator may establish trust in a public bootstrapping key of the IoT device. The AP may act as an agent (i.e., a proxy device) of the configurator and communicate with an authentication server. The AP may authenticate and authorize the IoT device before connecting the IoT device to the wireless network. The authentication server may receive a network access authorization request with a connector identifier from the AP. The connector identifier may include a hash of a public network access key of the IoT device. When the connector identifier in a network access authorization request is determined as valid, the authentication server permits the IoT device to access the wireless network and determines a configurable policy applicable to the IoT device from a set of configurable policies. The authentication server transmits the network permissions defined in the configurable policy to the AP. The IoT device may be connected via the AP to the wireless network based on network permissions.

Examples described herein may allow a quick onboarding of IoT devices to a wireless network by provisioning each of the IoT devices with a connector. The connector may be a security credential, of an IoT device. For example, the connector may include a public network access key of the IoT device. In some examples, the connector may be signed by the configurator of the wireless network. The IoT devices may be connected to the wireless network using respective connectors. This type of onboarding may lead to greater adoption of IoT devices. The provisioning of the connector by an AP through DPP, without accessing the wireless network, may ensure that the IoT device is a secure device when it connects to the wireless network. Further, in some examples, the use of configurable policies may provide a user with an opportunity to define policies for the IoT devices before the IoT devices connect to the wireless network.

Referring now to the figures, FIG. 1 is a system 100 for enabling onboarding of IoT devices to a wireless network 116 using DPP, in accordance with an example. In some examples, the system 100 may include an IoT device 102, an authentication server 104, one or more access points (APs), such as APs 106A, 106B, 106C . . . 106N, (hereinafter collectively referred to as APs 106), and a configurator 108. The APs 106 and the configurator 108 may communicate with each other via a wired network. During an initial phase, when the IoT device 102 is not provisioned to access the wireless network 116, the IoT device 102 may communicate with the configurator 108 using DPP messages via the APs 106. Once provisioned, the IoT device 102 may be connected to the wireless network 116.

In an example implementation, the system 100 may be part of a distributed setting, such as a university network or an enterprise network. In some instances, certain enterprise networks consider IoT devices as untrusted and restrict network access. Such restrictions may limit the types of applications the enterprise may implement with IoT devices. In some examples, DPP-based provisioning of the IoT device 102 by the authentication server 104, as described herein, may ensure authentication and configuration of the IoT device 102 securely. The DPP-based provisioning by the authentication server 104 may allow users to define access policies for the IoT device 102 before connecting it to the wireless network 116. In one implementation, the configurator 108 and the authentication server 104 may be part of a cloud platform associated with an enterprise. The term "network access" as used herein may refer to include access to a wireless network such as the wireless network 116.

Examples of the wireless network 116 may include, but are not limited to, an Internet Protocol (IP) or non-IP-based, wireless LAN (WLAN), metropolitan area network (MAN), wide area network (WAN), a storage area network (SAN), a personal area network (PAN), a cellular communication network, and the Internet. In some examples, the wireless network 116 may include the APs 106 to facilitate data communication. Communication over the wireless network 116 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the wireless network 116 may be enabled via wireless (e.g., Wi-Fi®, cellular communication, satellite communication, Bluetooth, etc.) communication technologies. In some examples, the wireless network 116 may be enabled via private communication links including, but not limited to, communication links established via Bluetooth, cellular communication, optical communication, radio frequency communication, and the like.

The IoT device 102 shown in FIG. 1 may be configured with a security credential to access the wireless network 116 by communicating data and DPP messages to the configurator 108 via one or more of the APs 106, in accordance with some examples. Examples of the IoT device 102 may include, but are not limited to, a location tag, an activity monitor, a connected thermostat, a monitoring camera, a sensor device, or any electronic or mechanical device that supports Internet connectivity. Although, a single IoT device 102 is depicted in the system 100 of FIG. 1, in some other examples, the system 100 may include more than one IoT device without limiting the scope of the present disclosure.

Further, in some examples, the authentication server 104 may be implemented as an independent server or may be part of a cloud. In some other examples, the authentication server 104 may be implemented as a hardware system/device, such as but not limited to, a computer system, a mobile device, a blade server, a computer appliance, a workstation, a storage system, or a converged or a hyperconverged system. In certain other examples, the authentication server 104 may be implemented as a software resource, such as, but not limited to, a software application, a virtual machine (VM), a container, a containerized application, or a pod. During operation, the authentication server 104 may facilitate authentication and/or authorization of the IoT device 102 and manage the onboarding of the IoT device 102 using DPP. The DPP is a standardized protocol that allows the IoT device 102 to be provisioned for network access using a controller (e.g., the configurator 108).

In some examples, the authentication server 104 may maintain bootstrapping information of the IoT device 102 to facilitate authentication and/or authorization of the IoT device 102 and manage the onboarding of the IoT device 102 to the wireless network 116. The term "bootstrapping information" as used herein may refer to information such as, but not limited to, a public bootstrapping key of the IoT device 102. In some examples, during manufacturing, IoT device vendors may embed bootstrapping key pairs in the IoT device. The public bootstrapping key of the IoT device 102 may be registered with an external cloud IoT platform 110. In some examples, the authentication server 104 may query the external cloud IoT platform 110, for obtaining the bootstrapping information of the IoT device 102. In response, the authentication server 104 may receive the public bootstrapping key from the external cloud IoT platform 110.

In some examples, the authentication server 104 may include a database (not shown) with the bootstrapping information of the IoT device 102. The database may be periodically synchronized with the external cloud IoT platform 110 for receiving and updating the bootstrapping information. In some examples, where the bootstrapping information of the IoT device 102 is not integrated into the external cloud IoT platform 110, the bootstrapping information of the IoT device 102 may be received by out-of-band means. For example, the bootstrapping information may be present on the IoT device 102 in the form of an indicia (e.g., a Quick Response (QR) code). A user may scan the indicia using a mobile application to receive the public bootstrapping key of the IoT device 102. The mobile application may update the public bootstrapping key of the IoT device 102 at the authentication server 104.

In some examples, the IoT device 102 may be an unmanaged device that is not associated with any user. Accordingly, defining an access policy for the IoT device 102 may be useful for overall network security. Accordingly, in some examples, the authentication server 104 may store access policies for the IoT device 102 in the policy database (not shown). The policy database may include user configuration files (or "configuration profiles") for the IoT device 102. A user can configure an access policy for the IoT device 102 based on a role of the IoT device 102. In some examples, the policy database may include configurable policies that may be applied to the IoT device 102 based on the role of the IoT device 102, which may be assigned by the authentication server 104. For example, when a voice-activated printer (an example of the IoT device 102) is provisioned to connect to an enterprise network, it may be configured to operate during office hours and for specific users before it connects to the enterprise network. In an example scenario, the printing process may be considered as a role assigned to the voice-activated printer and appropriate permissions may be defined for the device in the form of an access policy. The access policy may specify privileges such as users permitted to use the voice-activated printer and the time periods during which the voice-activated printer may be used.

Furthermore, in some examples, the APs 106 may be part of a wireless local area network (WLAN) and may provide wireless services to the IoT device 102 in an area covered by the respective APs 106. Examples of the APs 106, may include but are not limited to, routers, network switches, network gateways, and the like. In some examples, one of the APs 106 may act as a bridge for connecting an IoT device, such as the IoT device 102 to the wireless network 116. The APs 106 may be distributed throughout an area in which network access is desired. Accordingly, the IoT device 102 may be deployed within the area serviced by one or more of the APs 106.

In some examples, the configurator 108 may provision the IoT device 102 with a security credential. In some examples, the configurator 108 may be implemented using a processor or a microcontroller and/or any other electronic component, or a device or system that may facilitate various compute, data storage, and/or data processing. In certain other examples, the configurator 108 may be deployed as a software resource, for example, a virtual machine (VM), a container, a containerized application, or a pod. The configurator 108 may establish trust in the public bootstrapping key of the IoT device 102 and authenticate the IoT device 102 using a DPP authentication protocol. More details about authentication using DPP is described in conjunction with FIG. 2.

During operation, the configurator 108 may select an AP to perform the DPP authentication protocol and DPP configuration control from the APs 106 in the wireless network 116. The AP may be selected based on the Received Signal Strength Indicator (RSSI) and/or a current load of the APs 106. The RSSI may indicate the radio frequency (RF) signal strength of the wireless network 116 at the respective APs 106. In certain systems, when there is a high density of the APs 106 in the system 100, the configurator 108 may select a specific AP for configuring the IoT device 102 with a connector (i.e. security credential). For example, in a high-density deployment of APs at a warehouse, the configurator 108 may select an AP present at an onboarding location in the warehouse to assist with the provisioning of the connector for the IoT device 102. As will be appreciated, the selection of an appropriate AP as the agent of the configurator 108 may reduce the time required for onboarding the IoT device 102 to the wireless network 116.

For illustration purposes, the AP 106B may be selected by the configurator 108, based on one or more of the above-mentioned criteria. Accordingly, the AP 106B is hereinafter referred to as selected AP 106B. The terms "AP 106B" and "selected AP 106B" are used interchangeably hereinafter and refer to an AP selected by the configurator 108. The selected AP 106B may act as an agent of the configurator 108 for authenticating and configuring the IoT device 102 to access the wireless network 116. The authentication and configuration of the IoT device 102 are performed using the DPP authentication protocol and a DPP configuration protocol respectively. In particular, the selected AP 106B aids in exchanging DPP messages and information between the IoT device 102 and the configurator 108. The selected AP 106B communicates with the IoT device 102 over a DPP communication channel 118 between the IoT device 102 and the AP 106B. The DPP communication channel 118 is a dedicated communication medium established between the IoT device 102 and the AP 106B after verification of the public bootstrapping key of the IoT device 102. A single channel (or a small list of possible channels) may be pre-defined as the DPP communication channel 118 by the APs 106. The selected AP 106B may obtain the DPP messages on the DPP communication channel 118. The selected AP 106B may act as a proxy device for transmitting DPP messages between the IoT device 102 and the configurator 108. The selected AP 106B may act as an authenticator to authenticate the IoT device 102 on behalf of the authentication server 104.

Figure 2:
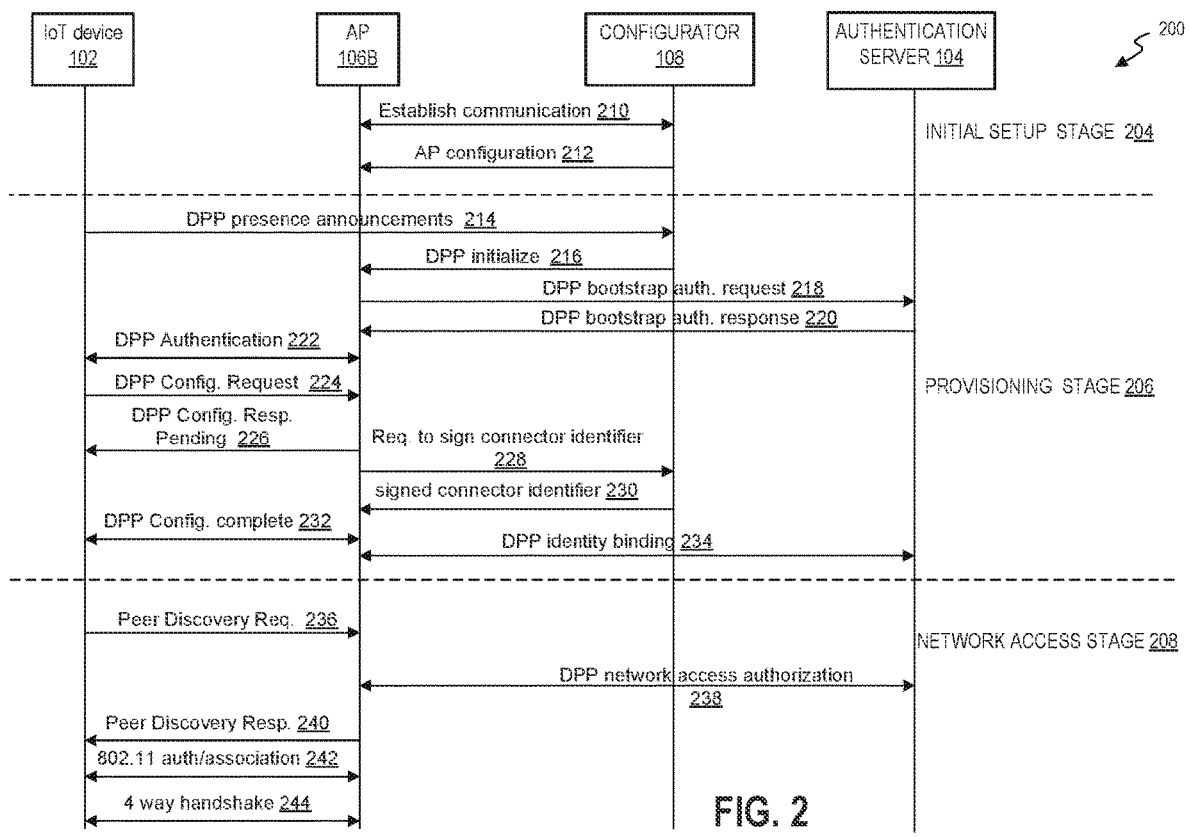
FIG. 2 illustrates a message flow diagram depicting a sequence of operations for onboarding of an IoT device, in accordance with an example.

Referring now to FIG. 2, a message flow diagram 200 depicting a sequence of operations for enabling onboarding of the IoT device 102 to the wireless network 116 is presented, in accordance with an example. The message flow diagram 200 depicts interactions between various entities, such as the IoT device 102, the authentication server 104, the configurator 108, and the selected AP 106B, in the system 100 in three stages, namely—an initial set-up stage 204, a provisioning stage 206 and a network access stage 208. For illustration purposes, the message flow diagram 200 of FIG. 2 is described with reference to the system 100 of FIG. 1, however, the scope of the present disclosure should not be construed as limited to the specifics (e.g., the numbers and arrangements of the APs 106, the configurator 108, the IoT device 102, and the authentication server 104) of the system 100 of FIG. 1.

Initial Set-Up Stage 204

During the initial set-up stage 204, the AP 106B may be configured to listen to DPP messages broadcasted over specific communication channels. Although the initial set-up stage 204 is described for the AP 106B, it should be understood that several APs in the wireless network 116 may be configured with respective DPP connectors to support DPP communication. For example, at step 210, the AP 106B and the configurator 108 may establish communication using a network (e.g., a wired network). Further, at step 212, the AP 106B may receive configuration information from the configurator 108. The configuration information may include a DPP connector of the AP 106B. The DPP connector may be a security credential provided by the configurator 108 to the AP 106B. The AP 106B may use the DPP connector to establish communication with the IoT device 102. In an example, the configuration information may include information related to the channels to be used by the AP 106B. Once configured, the AP 106B may advertise its ability to communicate via DPP. In an example, the IoT device 102 may scan the channels for advertisement from the AP 106B. Similarly, some or all of the APs 106 may be configured with respective DPP connectors and channel connectivity information to support DPP communication.

Provisioning Stage 206

In the provisioning stage 206, the IoT device 102 may be authorized and provisioned with the security credential required for network access. The IoT device 102 may scan, upon powering-on or at periodic intervals, all supported channels, and broadcasts DPP presence announcements periodically. In one example, the DPP presence announcements may be carried by 802.11 action frames. The DPP presence announcements may include the hash of the public bootstrapping key of the IoT device 102. The hash of the public bootstrapping key may be the identifier of the IoT device 102. At step 214, the configurator 108 may receive a list of presence announcements compliant with the DPP protocol from the IoT device 102 via the APs 106 in the wireless network 116. The DPP presence announcements transmitted by the IoT device 102 may be received by the APs 106, in which the DPP capability is pre-configured, during the initial set-up stage 204. The APs 106 may listen to the DPP presence announcements and may report a device chirping event to the configurator 108. The configurator 108 may monitor these DPP presence announcements to detect the IoT device 102 in RF coverage. At step 216, the configurator 108 may select an AP (for example, the AP 106B) to initialize DPP communication with the IoT device 102.

The DPP authentication protocol is initiated at the AP 106B to establish trust in the public bootstrapping key of the IoT device 102 by sending, at step 218, a DPP bootstrap authorization request to the authentication server 104 to check if the hash public bootstrapping key of the IoT device 102 is registered. The selected AP 106B may generate the DPP bootstrap authorization request using the hash of the public bootstrapping key present in the DPP presence announcements transmitted by the IoT device 102.

Further, at step 220, the authentication server 104 may verify the hash of the public bootstrapping key received in the DPP bootstrap authorization request. Based on successful verification of the bootstrapping information, the authentication server 104 may authenticate the IoT device 102 and verify that the IoT device 102 is an authorized device that may be provisioned to access the wireless network 116. To verify the public bootstrapping key of the IoT device 102, the authentication server 104 may synchronize with an external cloud IoT platform to receive the public bootstrapping key of the IoT device 102 at periodic intervals. If the hash of the public bootstrapping key of the IoT device 102 is registered with the external cloud IoT platform 110, the authentication server 104 may send a positive DPP bootstrap authorization response with bootstrapping information (i.e., the public bootstrapping key) of the IoT device 102 and the Extended Service Set Identification (ESSID) of the wireless network 116 to the selected AP 106B. In some examples, the selected AP 106B may receive the public bootstrapping key to authorize the IoT device 102. As the authentication server 104, maintains the public bootstrapping key of the IoT device 102, the repetitive bootstrapping for the same IoT device 102 can be avoided when the IoT device 102 disconnects and connects back to the system 100. Additionally, there is no or minimal human interaction involved in connecting/re-connecting the IoT device 102 to the wireless network 116.

Furthermore, at step 222, the selected AP 106B may provide the public bootstrapping key received from the authentication server 104 to the IoT device 102. The DPP authentication protocol is completed at step 222. On receiving a positive DPP bootstrap authorization response at the AP 106B, the AP 106B may establish the DPP communication channel 118 between the selected AP 106B and the IoT device 102. The IoT device 102 may generate a public network access key after successful verification of the public bootstrapping key of the IoT device 102.

At step 224, the DPP configuration protocol is initiated. Once the IoT device 102 is authenticated by the selected AP 106B, the IoT device 102 may send a DPP configuration request to the selected AP 106B. The DPP configuration request is sent to the selected AP 106B for receiving a security credential for the IoT device 102 for network access.

Moreover, at step 226, using the public network access key of the IoT device 102, the selected AP 106B may generate a connector for the IoT device 102 while the DPP configuration request is pending (shown in step 226). In some examples, the connector for the IoT device 102 may include the public network access key of the IoT device 102. At step 228, the selected AP 106B may transmit a request to sign the connector to the configurator 108. Further, at step 230, the configurator 108 may sign the connector using a configurator sign-in key of the configurator 108 and send the signed connector back to the AP 106B. At step 232, with the generation of the signed connector, the DPP configuration of the IoT device 102 with the security credential is complete and the signed connector may be provided to the IoT device 102, which may be used by the IoT device 102 to connect to the wireless network 116.

Additionally, at step 234, the selected AP 106B may transmit a DPP identity binding request to the authentication server 104 for binding a hash of the public network access key of the IoT device 102 with the hash of the public bootstrapping key of the IoT device 102. The hash of the public network access key of the IoT device 102 may be referred to as the connector identifier of the IoT device 102. The binding of a hash of the connector identifier and a hash of the public bootstrapping key of the IoT device 102 may allow the authentication server 104 to perform additional verification of the hash of the public bootstrapping key as required by DPP and the connector identifier during the network access stage 208.

Network Access Stage 208

During the network access stage 208, the IoT device 102 may gain access to the wireless network 116 via any of the APs 106 using the connector that the IoT device 102 has received from the selected AP 106B, without limiting the scope of the present disclosure. However, for simplicity of illustration, in the network access stage 208 illustrated in FIG. 2, the IoT device 102 is described as connecting to the wireless network 116 via the selected AP 106B.

At step 236, the IoT device 102 may discover any number of the APs 106 and transmit a peer discovery request and wait for a peer discovery response. In some examples, the IoT device 102 may send the peer discovery request to the AP 106B. The peer discovery request may include the connector of the IoT device 102 (e.g., the signed connector received from the selected AP 106B). The selected AP 106B may validate the connector of the IoT device 102 based on the configurator signature-key of the configurator 108. On successful validation of the connector, the selected AP 106B may generate and transmit a DPP network access authorization request including the connector identifier to the authentication server 104.

Further, at step 238, based on the validity of the connector identifier of the IoT device 102, the authentication server 104 may authenticate and authorize the IoT device 102 for network access. The authentication server 104 may respond with a DPP network access authorization response in the form of permission or rejection. The authentication server 104 may validate the hash of the public network access key of the IoT device 102 and verify the hash of the public bootstrapping key of the IoT device 102 to decide on permitting or rejecting the IoT device 102 for the network access. Based on the DPP network access authorization response from the authentication server 104, at step 240, the selected AP 106B may communicate the peer discovery response that is a response to the peer discovery request received from the IoT device at step 236.

The selected AP 106B may generate the peer discovery response based on the DPP network access authorization response received from the authentication server 104. At steps 240, 242, and 244, if the IoT device 102 is permitted to access the wireless network 116 by the authentication server 104, the IoT device 102 may derive pairwise master key (PMK)/PMK identity (PMKID), perform IEEE-802.11 authentication, association, and a 4-way handshake with the selected AP 106B to obtain access to the wireless network 116.

As will be appreciated, in the examples presented herein, the authentication server 104 may provide a zero-touch-provisioning experience for provisioning the security credential to the IoT device 102 and connecting the IoT device 102 to the wireless network 116 using the security credential. When the IoT device 102 is brought into the system 100 and powered on, the sequence of operations described in the message flow diagram 200 may be performed. The entire process from powering on the IoT device 102 to connecting to the wireless network 116 may get completed within a short period without requiring any manual intervention. Additionally, in some examples, once the IoT device 102 is connected to the wireless network 116, its network behavior may be continuously monitored. The authentication server 104 may be notified by a monitoring device (not shown) if any security threat is detected. The monitoring of the IoT device 102 may include determining several parameters such as vulnerability and risk associated with the IoT device 102, owner of the IoT device 102, network behavior, and operating system status. Additionally, in some examples, the authentication server 104 may evaluate notifications from the monitoring device based on configurable policies (described later) and may change network access permissions for the connected IoT device 102 by issuing a change of authorization (CoA) to the selected AP 106B. This helps isolate any compromised IoT device quickly and prevents security threats from spreading through the system 100.

Figure 3:
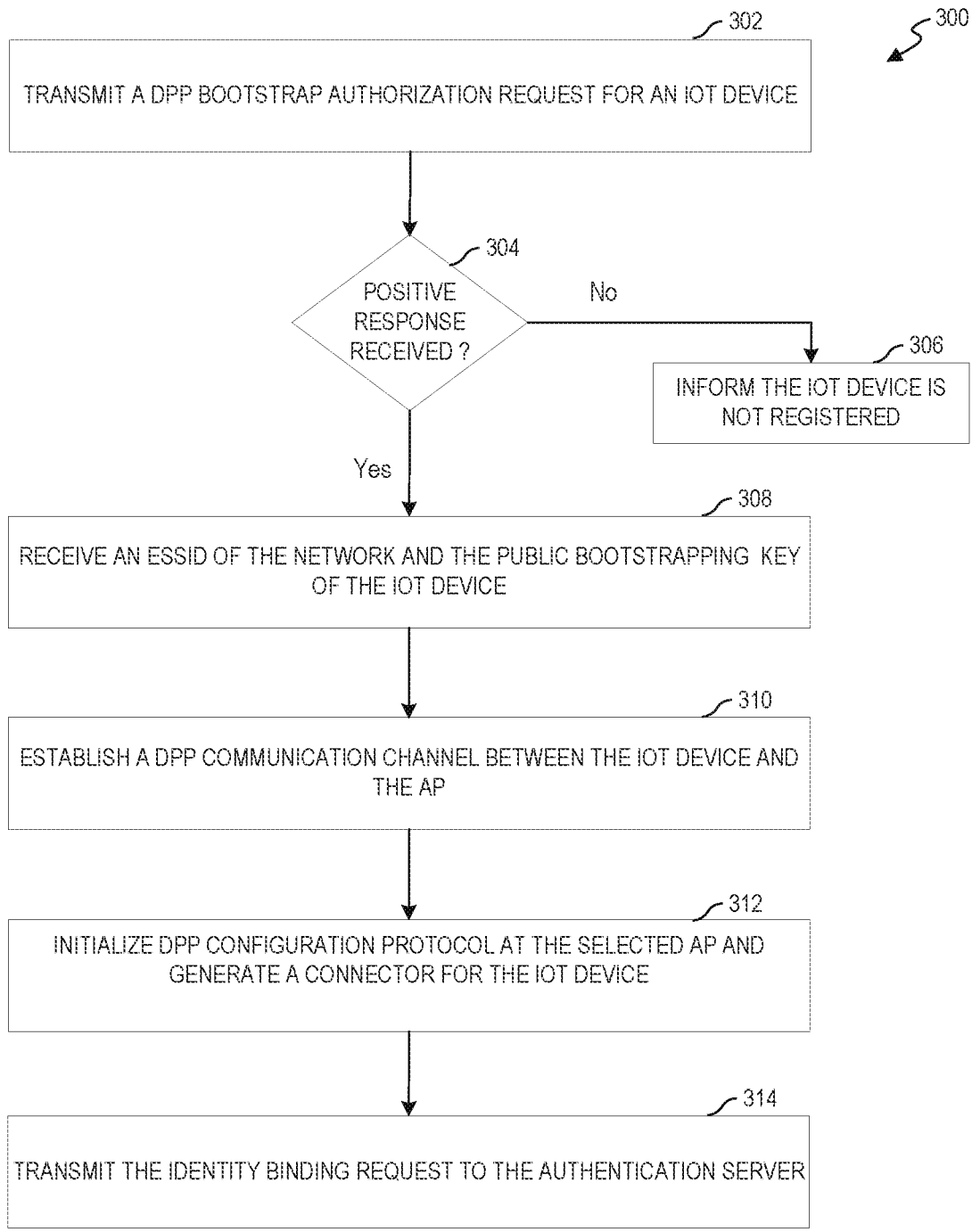
FIG. 3 is a flowchart depicting a method of provisioning a security credential to an IoT device by an AP, in accordance with an example.

Referring now to FIG. 3, a flowchart depicting method 300 for provisioning a security credential by an AP in a network is presented, in accordance with an example. The method 300 as depicted in FIG. 3 may be implemented in the form of executable instructions stored on a machine-readable medium and executed by a processing resource (e.g., a processor) and/or in the form of electronic circuitry at the selected AP. In some examples, operations illustrated in the method blocks of FIG. 3 may be performed by the selected AP 106B of FIG. 1.

At block 302, the selected AP may transmit a DPP bootstrap authorization request to the authentication server. The DPP bootstrap authorization request may include a hash of a public bootstrapping key of an IoT device. The DPP bootstrapping authorization request is generated to verify the hash of the public bootstrapping key of the IoT device received from the presence announcements of the IoT device. The verification of the hash public bootstrapping key is a step toward configuring the IoT device with the security credential. In response to the DPP bootstrap authorization request, the selected AP may either receive a positive bootstrap authorization response or a negative bootstrap authorization response from the authentication server 104.

Further, at block 304, the selected AP may perform a check to determine whether the positive DPP bootstrap authorization response is received from the authentication server. The positive bootstrap authorization response may indicate that the hash of the public bootstrapping key of the IoT device has been successfully verified by the authentication server and the IoT device can be provisioned with a connector for accessing a wireless network. At block 304, if it is determined that the positive DPP bootstrap authorization response is not received (i.e., the negative response is received), the selected AP, at block 306, may inform the IoT device that it is not a registered IoT device and cannot be authenticated. However, at block 304, if it is determined that the positive DPP bootstrap authorization response is received, the selected AP, at block 308, may receive an ESSID of the wireless network, a public bootstrapping key of the IoT device, and policies for the IoT device. The public bootstrapping key is received at the selected AP from the authentication server after verification of the hash of the public bootstrapping key of the IoT device.

At block 310, the selected AP may establish a DPP communication channel between the IoT device and the selected AP. The DPP communication channel allows the selected AP to exchange DPP configuration messages between a configurator and the IoT device. The selected AP may act as a proxy device for transmitting DPP messages between the IoT device and the configurator.

At block 312, the selected AP may initialize a DPP configuration protocol for provisioning the IoT device with the ESSID and the connector. The selected AP may generate the connector for the IoT device using a public network access key of the IoT device for provisioning network access to the IoT device. The connector may be generated after verification of the hash of the public bootstrapping key. The public network access key is generated by the IoT device after successful verification of the public bootstrapping key of the IoT device. The connector generated at the selected AP may be signed by the configurator with the configurator sign-in key. The connector is a security credential associated with the IoT device and may be used by the IoT device to request an access to the wireless network 116.

At block 314, after provisioning the IoT device with the connector, the selected AP may send a DPP identity binding request to the authentication server for binding a hash of the public bootstrapping key of the IoT device with a hash of the public network access key of the IoT device as an identity for use in network access. The binding of the hash public bootstrapping key of the IoT device and the hash of the public network access key of the IoT device allows the authentication server to simultaneously validate the connector identifier and verify the public bootstrapping key.

Figure 4:
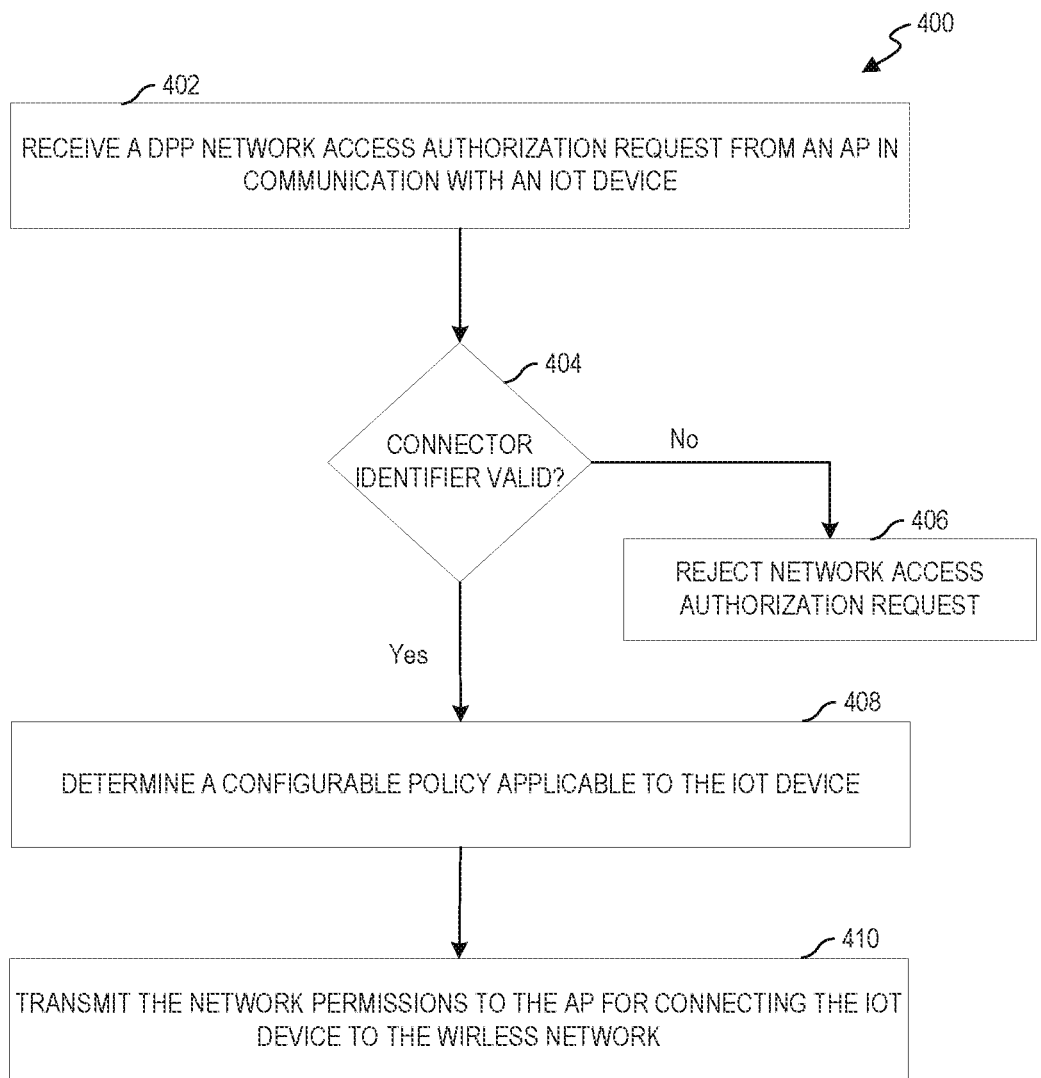
FIG. 4 is a flow diagram depicting a method including operations performed by an authentication server for connecting an IoT device to a wireless network, in accordance with an example.

Turning now to FIG. 4, a flow diagram depicting a method 400 performed by an authentication server for connecting an IoT device to a wireless network is presented, in accordance with an example. The method 400 shown in FIG. 4 may be implemented in the form of executable instructions stored on a machine-readable medium and executed by a processing resource (e.g., a processor) and/or in the form of electronic circuitry at the authentication server. In an example, the steps of method 400 may be performed after provisioning the security credential for the IoT device. In another example, the steps of method 400 may be performed when a previously configured IoT device tries to reconnect to the wireless network. In cases when the IoT device disconnects from the wireless network and tries to reconnect, it can request network access using the same connector at any of the APs in the wireless network without requiring provisioning of the IoT device with a new connector. In some examples, the steps described in method 400 may be performed by the authentication server 104 shown in FIG. 1.

At block 402, the authentication server may receive a DPP network access authorization request from an AP in communication with the IoT device. The network access authorization request is generated by the AP on receiving a DPP peer discovery request (with connector) from the IoT device. The network access authorization request may include a connector identifier of the IoT device.

At block 404, the authentication server may perform a check to determine the validity of the connector identifier in the DPP network access authorization request. The authentication server may verify the public network access key of the IoT device by comparing it with a hash of the public network access key stored at the authentication server. In some implementations, along with the connector identifier, the authentication server may also check the status of antivirus and anti-malware capability of the IoT device before granting access to the network. At block 404, if it is determined that the connector identifier is invalid, the authentication server may reject (at block 406) the network access authorization request. In some cases, the network access for the IoT device may be temporarily revoked or permanently removed by moving the IoT device into a deny list. The deny list may be maintained by the authentication server. Additionally, when an IoT device is un-registered or removed from the external cloud IoT platform, the information is synchronized with the authentication server. The connector identifier of the IoT device is then moved to the deny list. The IoT device can automatically be moved to the deny list without administrator intervention when the network access is revoked for the IoT device or when the IoT device is un-registered from the external cloud IoT platform.

At block 404, if it is determined that the connector identifier is valid, the authentication server, at block 408, may determine a configurable policy applicable to the IoT device from a set of configurable policies. In some examples, each configurable policy may be associated with the role of the IoT device. In some examples, the authentication server may assign a role for the IoT device. Based on the role of the IoT device, the authentication server may determine a configurable policy, from the set of configurable policies that may apply to the IoT device.

In an example, the configurable policies may be access policies that may be defined for IoT devices according to the role of the IoT device by the users (e.g., an administrator). In some examples, the configurable policies may be alterable. The administrator of the wireless network may change the configurable policy if required. Each configurable policy may include network permissions for the IoT device. The network permissions define rights and privileges for the IoT device. In an example, when a camera device is being provisioned to connect to a wireless network, a configurable policy associated with video capture devices may be applicable for the camera device. The configurable policy may include network permissions. In an example, the network permissions may include specifying the users who can access the camera device and the operations the users are allowed to perform via the camera device.

At block 410, the authentication server transmits the network permissions defined in the configurable policies to the AP. The IoT device may connect to the wireless network via the AP based on the network permissions defined in the configurable policy applicable to the IoT device. Once connected to the wireless network using a Wi-Fi connection between the AP and the IoT device, the IoT device can transmit and/or receive data via the wireless network. In the context of FIG. 1, in some examples, the IoT device 102 may connect to the wireless network 116 via the AP based on the network permissions defined in the configurable policy.

Besides validating the connector identifier for providing network access to the IoT device, in some examples, the authentication server may also verify the hash public bootstrapping key of the IoT device. The authentication server may receive a hash of a public bootstrapping key from the AP communicating with the IoT device. The authentication server may determine if the hash of the public bootstrapping key is valid and transmit the public bootstrapping key to the AP. The operations performed by the AP and the authentication server for verifying the hash of the public bootstrapping key of the IoT device are described in detail in FIGS. 2 and 3.

Figure 5:
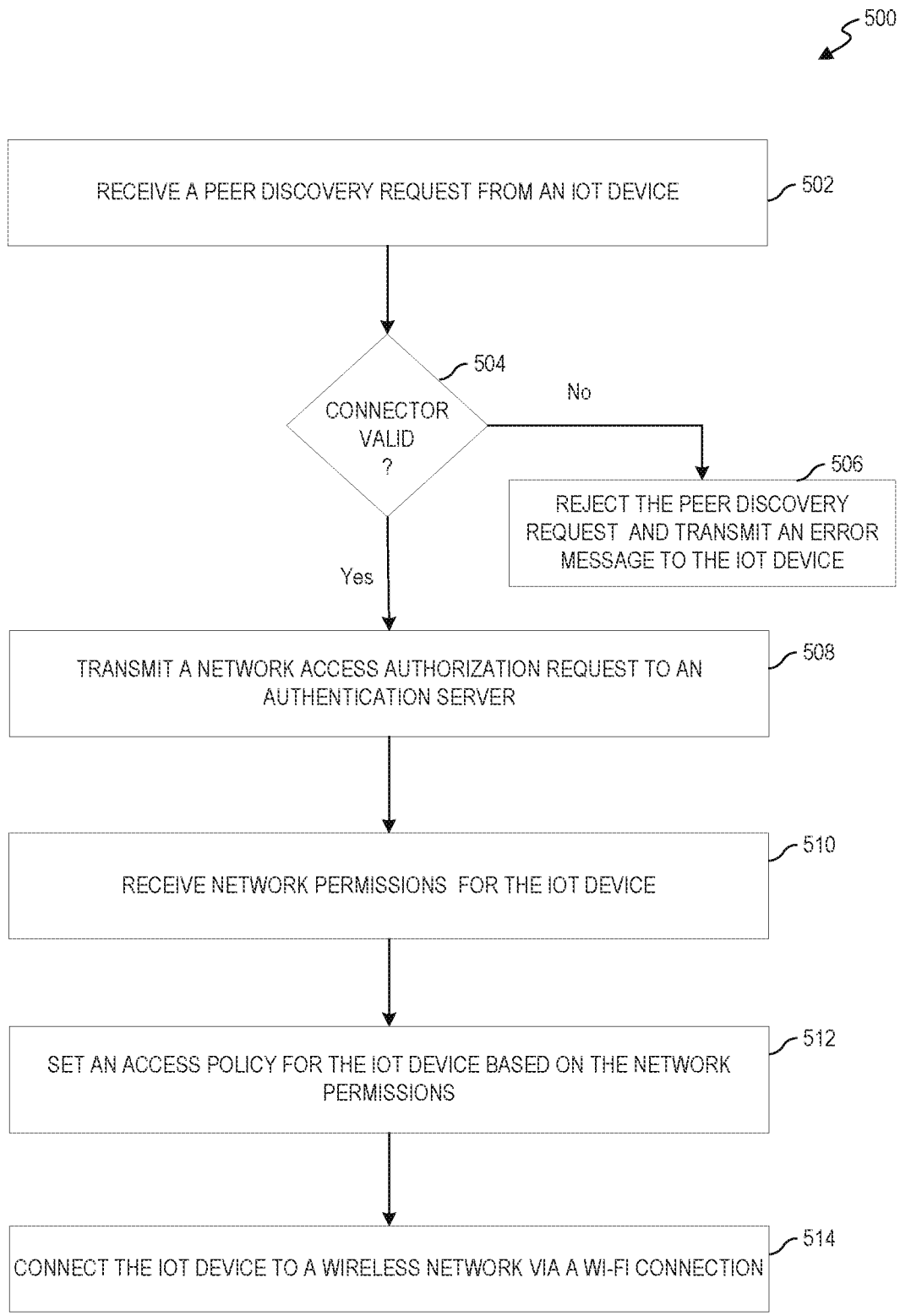
FIG. 5 is a flowchart depicting a method including operations performed by an AP for connecting an IoT device to a wireless network, in accordance with an example.

Referring now to FIG. 5, a flowchart depicting a method 500 performed by an AP for connecting an IoT device to a wireless network is presented, in accordance with an example. Method 500 may also be referred to as a DPP network discovery phase. At block 502, the AP may receive a DPP peer discovery request frame from the IoT device. The DPP peer discovery request frame may be sent by the IoT device for discovering APs and other devices in the wireless network. The peer discovery request frame may include a connector of the IoT device.

Further, at block 504, the AP may determine whether the connector of the IoT device is valid. The AP may determine that the connector is valid if the connector is signed by a configurator of the wireless network. At block 504, if it is determined that the connector is not valid (i.e., not signed by the configurator of the wireless network), the AP (at block 506) may reject the peer discovery request and transmit an error message to the IoT device. This type of validation of the connector ensures that the IoT device can connect only the network (e.g., the wireless network) to which they are provisioned to. At block 504, if is it determined that the connector is signed by the configurator of the wireless network, the AP can validate that the connector of the IoT device was provisioned to access the wireless network.

Further, at block 508, if it is determined that the connector is valid (i.e., signed by the configurator of the wireless network), the AP may generate and transmit (at block 508) a DPP network access authorization request to an authentication server. The network access authorization request may include the connector identifier of the IoT device. In the system 100 of FIG. 1, any of the APs 106 receiving the peer discovery request frame may transmit the connector identifier of the IoT device 102 to the authentication server 104 in the DPP network access authorization request.

Moreover, at block 510, the AP may receive the network permissions for the IoT device from the authentication server when the connector identifier is successfully validated by the authentication server. In an example, the network permissions may define the behavior of the IoT device when it connects to the wireless network. In another example, the network permissions may specify time intervals of a day during which data transfer from the IoT device is permissible.

Further, at block 512, the AP may set an access policy for the IoT device based on the network permissions. In an example, the access policy may specify a periodic interval at which the IoT device can transmit data. The setting of the access policy for the IoT device may allow the user to control the actions performed by the IoT device. For example, the access policy may define access permission to specific data in a cloud IoT platform for the IoT device. Additionally, in some examples, once the access policy is set, the AP, at block 514, the AP may transmit its DPP connector to the IoT device and may establish a Wi-Fi connection between the AP and the IoT device thereby connecting the IoT device to the wireless network. In an example of FIG. 1, the IoT device 102 may be connected to the wireless network 116 via a Wi-Fi connection between an AP 106C and the IoT device 102.

In some examples, an AP provisioning the IoT device with the connector may be separate from an AP connecting the IoT device to the wireless network. For example, as described in FIGS. 1 and 2, while the selected AP 106B may act as an agent of the configurator 108 and configure the IoT device 102 with the connector, the selected AP 106B or any other AP of the APs 106 may aid in connecting the IoT device 102 to the wireless network 116. In certain other examples, the selected AP 106B (as discussed in FIG. 2) may be involved in both the provisioning of the connector and the connection of the IoT device 102 to the wireless network.

Figure 6:
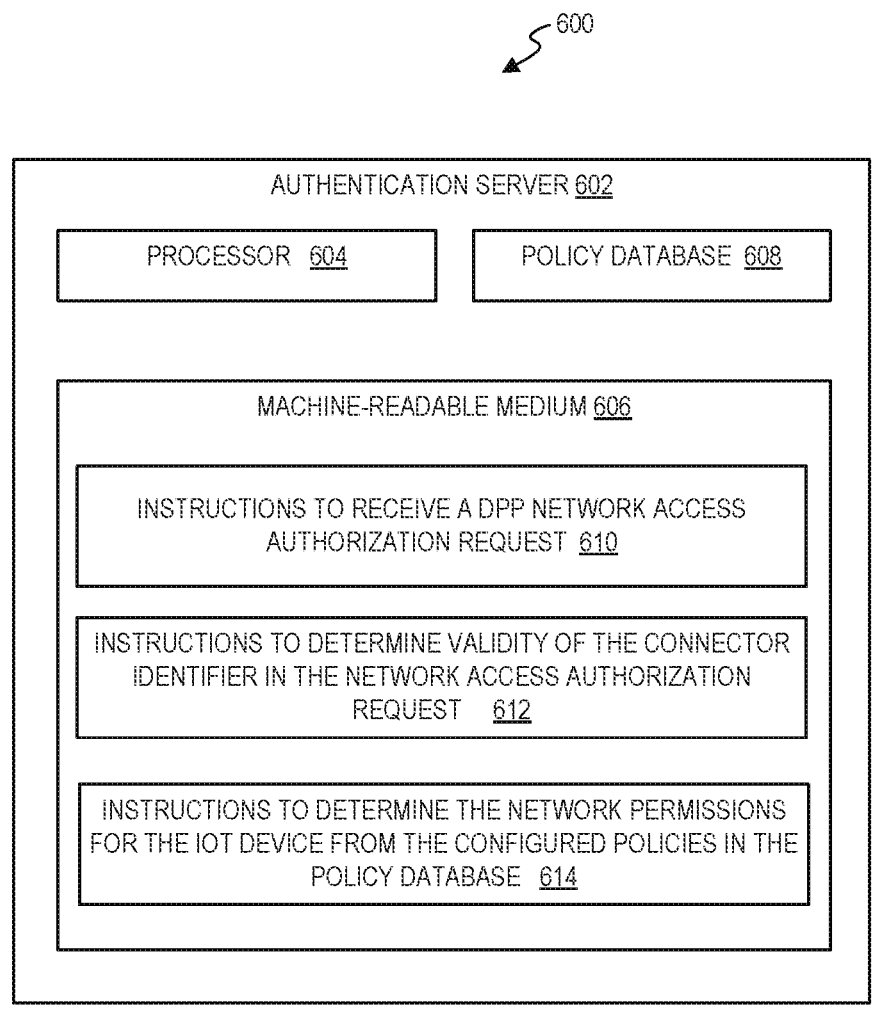
FIG. 6 is a block diagram of an authentication server, in accordance with an example.

FIG. 6 is a block diagram 600 showing an authentication server 602 encoded with example instructions to connect an IoT device to a wireless network using DPP, in accordance with an example. The authentication server 602 may be representative of one example of the authentication server 104 shown in FIG. 1 or any other computing device with similar capabilities.

The authentication server 602 may include the processor 604, the machine-readable medium 606, and the policy database 608. The processor 604 may be implemented as one or more microprocessors, microcomputers, microcontrollers, digital signal processors, central processing units, state machines, logic circuitries, and/or any devices that manipulate signals based on operational instructions. Further, in some examples, the machine-readable medium 606 may be any electronic, magnetic, optical, or other physical storage device that may store data and/or executable instructions. Therefore, the machine-readable medium 606 may be, for example, Random Access Memory (RAM), an Electrically Erasable Programmable Read-Only Memory (EEPROM), a storage drive, a flash memory, a Compact Disc Read-Only Memory (CD-ROM), and the like. As described in detail herein, the machine-readable medium 606 may be encoded with executable instructions 610, 612, and 614 (hereinafter collectively referred to as instructions 610-614) for authenticating and connecting the IoT device to the wireless network.

The policy database 608 may include a set of configurable policies defined using one or more configuration files, or configuration profiles, for a plurality of IoT devices. A user can configure policies for the IoT device 102 based on the role of the IoT device. In some examples, the policy database 608 may be stored in the machine-readable medium 606.

The processor 604 may be coupled to the machine-readable medium 606. The processor 604 may be configured to execute the instructions 610-614 (i.e. programming or software code) stored in the machine-readable medium 606 for authenticating and connecting the IoT device to the wireless network. In some examples, the processor 604 may fetch, decode, and execute the instructions 610-614 stored in the machine-readable medium 606 for authenticating and connecting the IoT device to the wireless network. In certain examples, as an alternative or in addition to retrieving and executing the instructions 610-614, the processor 604 may include at least one integrated circuit, other control logic, other electronic circuits, or combinations thereof that include a number of electronic components for performing the functionalities intended to be performed by the authentication server 602.

In some examples, the instructions 610, when executed by the processor 604, may cause the processor 604 to receive a DPP network access authorization request from an AP. Further, the instructions 612, when executed by the processor 604, may cause the processor 604 to determine if a connector identifier in the DPP network access authorization request is valid. Furthermore, in some examples, the instructions 614, when executed by the processor 604, may cause the processor 604 to determine a configurable policy applicable to the IoT device from a set of configurable policies in response to determining that the connector identifier is valid.

As will be appreciated, the onboarding of the IoT device using DPP communication results in faster and secure provisioning of the IoT device without requiring any manual configuration. Additionally, once the IoT device is configured with the connector, it may not require reconfiguring every time the IoT device reconnects to the wireless network. Moreover, the IoT devices may be monitored and the network policies for the IoT device may be altered instantly using the configurable policies.

Figure 7:
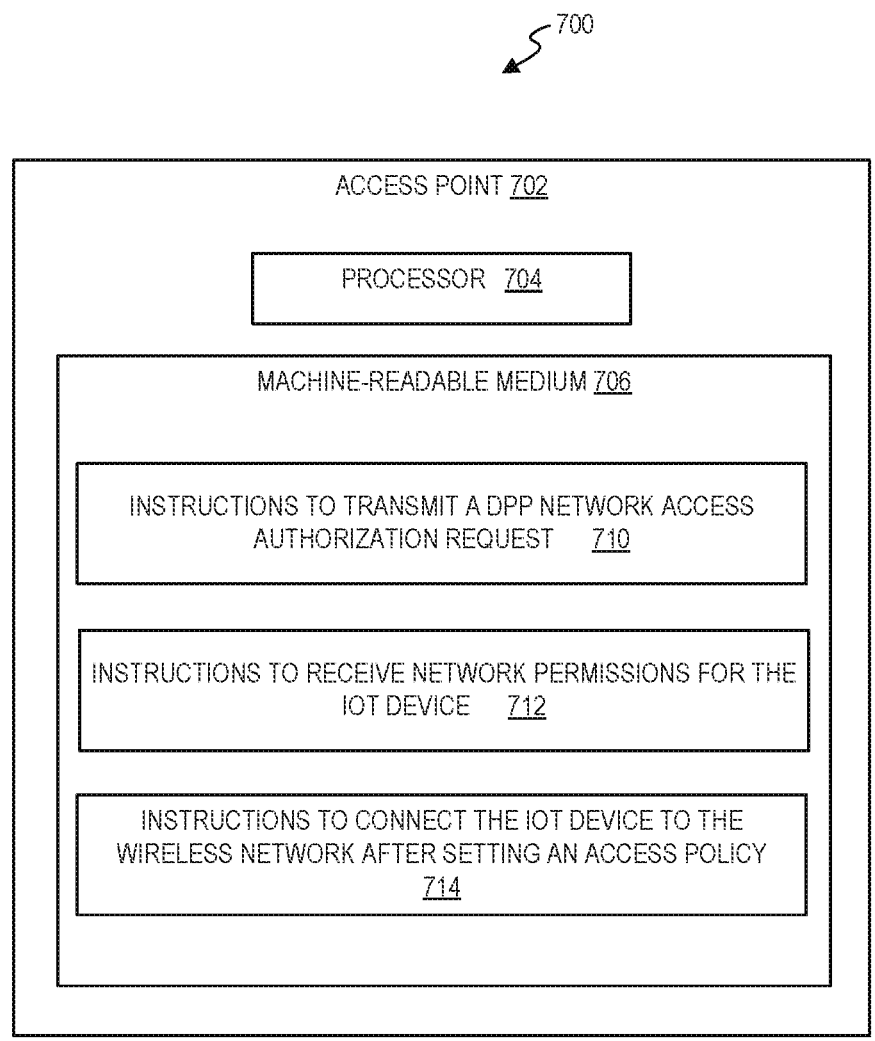
FIG. 7 is a block diagram of an access point, in accordance with an example.

FIG. 7 is a block diagram 700 showing an AP 702 encoded with example instructions to connect the IoT device to the wireless network, in accordance with an example. The AP 702 may be representative of one example of any of the APs 106 or any other computing device with similar capabilities. The AP 702 may include the processor 704 and the machine-readable medium 706 that are representative of examples of the processor 704 and the machine-readable medium 606 of FIG. 6, details of which are not repeated herein. The machine-readable medium 706 may be encoded with executable instructions 710, 712, and 714 (hereinafter collectively referred to as instructions 710-714) for setting up the access policy based on network permissions connecting the IoT device to the wireless network. The processor 704 may be coupled to the machine-readable medium 706 and configured to execute instructions 710-714 (i.e. programming or software code) stored in the machine-readable medium 706 for setting up the access policy and for connecting the IoT device to the wireless network. In some examples, the processor 704 may fetch, decode, and execute the instructions 710-714 stored in the machine-readable medium 706 for setting up the access policy and connecting the IoT device to the wireless network based on the network permissions. In certain examples, as an alternative or in addition to retrieving and executing the instructions 710-714, the processor 704 may include at least one integrated circuit, other control logic, other electronic circuits, or combinations thereof that include a number of electronic components for performing the functionalities intended to be performed by the AP 702. Although not shown, in some examples, the machine-readable medium 706 may be encoded with certain additional executable instructions to perform operations at one or more blocks in the method 300 and method 500 described in FIGS. 3 and 5, without limiting the scope of the present disclosure.

In some examples, the instructions 710, when executed by the processor 704, may cause the processor 704 to transmit, to an authentication server, a DPP network access authorization request. Further, the instructions 712, when executed by the processor 704, may cause the processor 704 to receive network permissions for the IoT device when a connector identifier in the DPP network access authorization request is validated by an authentication server. Furthermore, in some examples, the instructions 714, when executed by the processor 704, may cause the processor 704 to connect the IoT device to the wireless network after setting an access policy for the IoT device based on the network permissions.

In the foregoing description, numerous details are set forth to provide an understanding of the subject matter disclosed herein. However, the implementation may be practiced without some or all of these details. Other implementations may include modifications, combinations, and variations from the details discussed above. It is intended that the following claims cover such modifications and variations.

What is claimed is:

1. A method comprising:
    receiving, by an authentication server, a Device Provisioning Protocol (DPP) network access authorization request from an access point (AP) communicating with an Internet of Things (IoT) device, wherein the DPP network access authorization request comprises a connector identifier, wherein the connector identifier is a hash of a public network access key of the IoT device;
    determining, by the authentication server, validity of the connector identifier; and
    in response to determining that the connector identifier is valid,
        determining, by the authentication server, a configurable policy from a set of configurable policies that is applicable to the IoT device, wherein the configurable policy comprises of network permissions, and transmitting by the authentication server, the network permissions to the AP for connecting the IoT device to a wireless network;
    receiving, by the authentication server, a DPP bootstrap authorization request from the AP communicating with the IoT device, wherein the DPP bootstrap authorization request comprises a hash of a public bootstrapping key of the IoT device;
    determining, by the authentication server, if the hash of the public bootstrapping key is valid; and
    in response to determining that the hash of the public bootstrapping key is valid, transmitting, by the authentication server, the public bootstrapping key for the IoT device to the AP.

2. The method of claim 1, wherein determining the configurable policy comprises assigning, by the authentication server, a role to the IoT device, wherein the configurable policy applicable to the IoT device is determined based on the role of the IoT device.

3. The method of claim 1, wherein determining if the hash of the public bootstrapping key is valid further comprises determining if the public bootstrapping key is registered with an external cloud IoT platform.

4. The method of claim 3, further comprising receiving, by the authentication server, the public bootstrapping key from one of the external cloud IoT platform or a mobile application.

5. The method of claim 1, further comprising binding, by the authentication server, the hash of the public network access key of the IoT device with the hash of the public bootstrapping key of the IoT device.

6. An access point (AP) for connecting an Internet of Things (IoT) device to a wireless network, the AP comprising:
    a processor; and
    a machine-readable medium storing instructions that when executed by the processor, causes the processor to:
        transmit, to an authentication server, a Device Provisioning Protocol (DPP) network access authorization request, wherein the DPP network access authorization request is generated based on a DPP peer discovery request received at the AP from the IoT device;
        receive, from the authentication server, network permissions for the IoT device after a connector identifier in the DPP network access authorization request is validated by the authentication server; and
        connect the IoT device to the wireless network after setting an access policy based on the network permissions;
    transmit, to the authentication server, a DPP bootstrap authorization request for the IoT device, wherein the DPP bootstrap authorization request is generated for verifying a hash of a public bootstrapping key of the IoT device; and
    generate a connector for the IoT device based on a positive bootstrap authorization response being received at the AP, wherein the positive bootstrap authorization response indicates that the hash of the public bootstrapping key has been successfully verified by the authentication server.

7. The AP of claim 6, wherein the machine-readable medium stores additional instructions that when executed by the processor, cause the processor to transmit a DPP identity binding request to the authentication server for binding the connector identifier with the hash of the public bootstrapping key, wherein the connector identifier is a hash of a public network access key of the IoT device.

8. The AP of claim 6, wherein the machine-readable medium stores additional instructions that when executed by the processor, causes the processor to exchange DPP configuration messages between a configurator of the wireless network and the IoT device.

9. The AP of claim 8, wherein the connector of the IoT device is signed by the configurator.

10. The AP of claim 9, wherein the machine-readable medium stores additional instructions that when executed by the processor, cause the processor to generate the DPP network access authorization request based on validation of the connector, wherein the AP validates the connector based on a configurator signature-key of the configurator.

11. The AP of claim 8, wherein the machine-readable medium stores additional instructions that when executed by the processor, causes the processor to establish a DPP communication channel between the IoT device and the AP, wherein the DPP communication channel is established based on the positive bootstrap authorization response.

12. The AP of claim 11, wherein the IoT device communicates with the AP over the DPP communication channel to provision access to the wireless network for the IoT device.

13. An authentication server comprising:
a processor; and
a machine-readable medium storing instructions that when executed by the processor, causes the processor to:
receive a Device Provisioning Protocol (DPP) network access authorization request from an access point (AP), wherein the AP generates the DPP network access authorization request upon receiving a DPP peer discovery request from an IoT device;
determine if a connector identifier in the DPP network access authorization request is valid, wherein the connector identifier is a hash of a public network access key of the IoT device; and
in response to determining that the connector identifier is valid, determine a configurable policy from a set of configurable policies that is applicable to the IoT device, and transmit network permissions to the AP for connecting the IoT device to a wireless network, wherein the network permissions are defined in the configurable policy;
receive a DPP bootstrap authorization request from the AP communicating with the IoT device, wherein the DPP bootstrap authorization request comprises a hash of a public bootstrapping key of the IoT device;
determine if the hash of the public bootstrapping key is valid; and
in response to determining that the hash of the public bootstrapping key is valid, transmit the public bootstrapping key for the IoT device to the AP.

14. The authentication server of claim 13, wherein the instructions to determine the configurable policy further comprises of additional instructions that when executed by the processor, causes the processor to assign a role for the IoT device, wherein the configurable policy applicable to the IoT device is determined based on the role of the IoT device.

15. The authentication server of claim 13, wherein the machine-readable medium stores additional instructions that when executed by the processor, causes the processor to determine if the public bootstrapping key of the IoT device is registered with an external cloud IoT platform.

16. The authentication server of claim 13, wherein the machine-readable medium stores additional instructions that when executed by the processor, causes the processor to bind the hash of the public network access key of the IoT device with the hash of the public bootstrapping key of the IoT device.

17. The authentication server of claim 13, wherein the DPP peer discovery request comprises a connector of the IoT device.

* * * * *